(12) United States Patent
Kim et al.

(10) Patent No.: US 9,252,849 B2
(45) Date of Patent: Feb. 2, 2016

(54) STRUCTURE OF ADAPTIVE MULTIPLE ANTENNAS AND COMMUNICATION DEVICE AND METHOD USING ADAPTIVE MULTIPLE ANTENNAE

(75) Inventors: Kyeong Pyo Kim, Daejeon (KR); Kap Seok Chang, Daejeon (KR); Woo Yong Lee, Daejeon (KR); Seung Joon Lee, Seoul (KR); Hyun Kyu Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1076 days.

(21) Appl. No.: 13/334,095

(22) Filed: Dec. 22, 2011

(65) Prior Publication Data

US 2012/0163217 A1      Jun. 28, 2012

(30) Foreign Application Priority Data

Dec. 23, 2010   (KR) ........................ 10-2010-0133384

(51) Int. Cl.
| | |
|---|---|
| H04B 7/04 | (2006.01) |
| H04W 48/08 | (2009.01) |
| H04W 48/16 | (2009.01) |
| H04W 88/02 | (2009.01) |

(52) U.S. Cl.
CPC ............. *H04B 7/04* (2013.01); *H04W 48/08* (2013.01); *H04W 48/16* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 2008/0311944 | A1* | 12/2008 | Hansen et al. ................. | 455/517 |
| 2009/0196371 | A1* | 8/2009 | Yamamoto et al. ........... | 375/267 |
| 2009/0323836 | A1* | 12/2009 | Nakano et al. ................. | 375/260 |
| 2010/0183099 | A1* | 7/2010 | Toda et al. ..................... | 375/340 |

OTHER PUBLICATIONS

Yokoi et al., Improvement of Channel Capacity on MIMO Antenna Systems with Antenna Pattern Selection, Jun. 2007.*

* cited by examiner

*Primary Examiner* — Jae Y Lee
*Assistant Examiner* — Aixa Guadalupe-Cruz
(74) *Attorney, Agent, or Firm* — Rabin & Berdo, P.C.

(57) ABSTRACT

The present invention relates to communication using multiple antennas, and more particularly, to an apparatus and method for adaptively adjusting, based on a channel environment, an interval and direction of multiple antennas each of a transmitter and a receiver. A communication method according to the present invention may include verifying information about a channel state based on a pilot signal transmitted for each antenna of a transmitter, adjusting intervals among antennas of a receiver based on the information about a channel state, calculating transmission capacity values according to the adjusted intervals among antennas, and setting an antenna to an antenna interval corresponding to a transmission capacity having a highest value among the transmission capacity values calculated.

14 Claims, 7 Drawing Sheets

STRUCTURE OF ADAPTIVE MULTIPLE ANTENNAS AND COMMUNICATION DEVICE AND METHOD USING ADAPTIVE MULTIPLE ANTENNAE

CROSS-REFERENCE TO RELATED APPLICATION

This application claims the benefit of Korean Patent Application No. 10-2010-0133384, filed on Dec. 23, 2010, in the Korean Intellectual Property Office, the disclosure of which is incorporated herein by reference.

BACKGROUND

1. Field of the Invention

The present invention relates to communication using multiple antennas, and more particularly, to an apparatus and method for adaptively adjusting, based on a channel environment, an interval and direction of multiple antennas each of a transmitter and a receiver.

2. Description of the Related Art

A wireless mobile communication market is growing continuously, and various multimedia services are being used in a wireless environment. Recently, a high capacity of data is being transmitted and a high speed of a data transmission is performed to provide a multimedia service. In turn, this leads to research being conducted on a multi-antenna system for using limited frequency resources effectively.

When an interval between antennas is insufficient, a correlation may occur between antennas that may not receive a signal independently. The correlation between antennas at a reception end may deteriorate a degree of freedom of a channel, thereby decreasing a communication capacity of an entire system.

SUMMARY

An aspect of the present invention provides an apparatus and method for adaptively adjusting an optimal structure of multiple antennas of a transmitter and a receiver based on a channel state that varies over time to obtain a maximum transmission capacity.

Another aspect of the present invention also provides an apparatus and method for adjusting directions of multiple antennas of a transmitter and directions of multiple antennas of a receiver based on a channel state.

According to an aspect of the present invention, there is provided a communication method using adaptive multiple antennas, the communication method including verifying information about a channel state based on a pilot signal transmitted for each antenna of a transmitter, adjusting intervals among antennas of a receiver based on the information about a channel state, calculating transmission capacity values according to the adjusted intervals among antennas, and setting an antenna to an antenna interval corresponding to a transmission capacity having a highest value among the transmission capacity values calculated.

The receiving of the information about a channel state may be verified for each predetermined period.

Pilot signals received from each antenna of the transmitter may be received using different time-slots or subcarriers so as to avoid collisions.

The adjusting may include calculating a transmission capacity of a received pilot signal while increasing the antenna interval by a predetermined interval.

The information about a channel state may include information about a signal to noise ratio (SNR) of a signal received by the receiver.

According to another aspect of the present invention, there is provided a communication device using adaptive multiple antennas, the communication device including a channel state information receiver to receive pilot signals from antennas of a transmitter, and to verify information about a channel state based on the pilot signals, a location adjustment unit to adjust locations of the antennas by referring to the information about a channel state based on the pilot signals received from the antennas of the transmitter, and a transmission capacity calculator to calculate transmission capacity values according to the adjusted locations, and to compute a transmission capacity value having a highest value among the transmission capacity values calculated.

The channel state information receiver may verify channel states of the pilot signals received from the antennas of the transmitter for each predetermined period.

The channel state information receiver may receive the pilot signals received from each antenna of the transmitter using different time-slots or subcarriers so as to avoid collisions.

The location adjustment unit may calculate transmission capacity values of received pilot signals while increasing an antenna interval by a predetermined interval.

The location adjustment unit may adjust an interval, a location, and a direction of antennas so that the transmission capacity values calculated reach a maximum value.

According to still another aspect of the present invention, there is provided a communication method using adaptive multiple antennas, the communication method including transmitting pilot signals so as to correspond to antennas of a receiver, receiving transmission capacity values according to information about a channel state in the receiver, and setting antennas of a transmitter to antenna intervals corresponding to a transmission capacity having a highest value among the received transmission capacity values.

The transmission capacity values based on the information about a channel state received in the receiver may be received as response signals when a pilot signal is transmitted in a state in which an antenna setting is changed in an antenna of a transmitter.

According to yet another aspect of the present invention, there is provided a communication device using adaptive multiple antennas, the communication device including a pilot signal transmitter to transmit pilot signals corresponding to antennas of a receiver, and a location adjustment unit to adjust locations of antennas by receiving, from the receiver, information about a channel state based on transmission of the pilot signals.

The location adjustment unit may set antennas to a location at which a transmission capacity value corresponds to a highest value by verifying the transmission capacity value based on the information about a channel state received from the receiver in response to a change of antenna settings.

According to an embodiment of the present invention, it is possible to enhance a transmission capacity by adjusting an interval of a transmission antenna or a reception antenna to be appropriate to a given channel state.

According to another embodiment of the present invention, it is possible to enhance a transmission capacity by adjusting a direction of a transmission antenna or a reception antenna to be appropriate to a given channel state.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
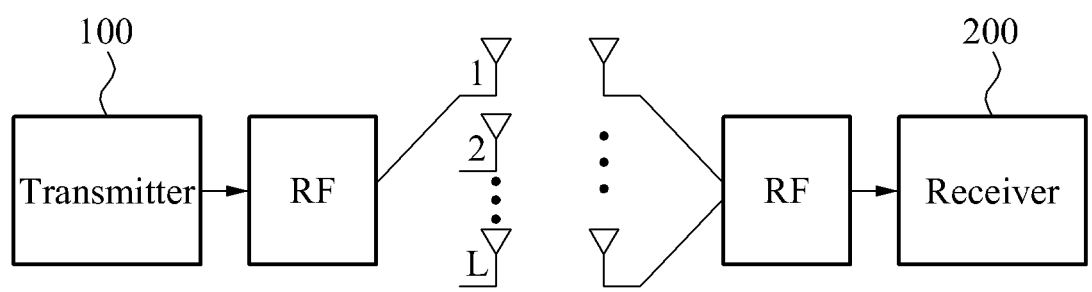
FIG. 1 is a block diagram illustrating a signal transceiver according to embodiments of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a signal transceiver according to embodiments of the present invention.

Referring to FIG. 1, a signal transceiver according to embodiments of the present invention may include a transmitter 100 having multiple antennas and a receiver 200 having at least one antenna.

Figure 2:
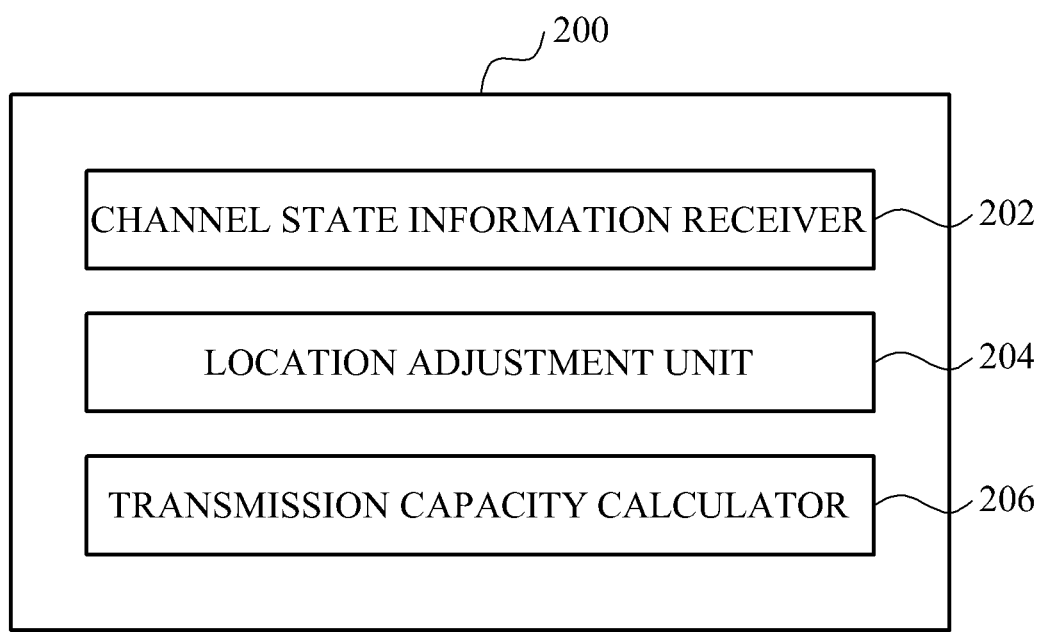
FIG. 2 is a block diagram illustrating a configuration of a receiver according to embodiments of the present invention.

FIG. 2 is a block diagram illustrating a configuration of a receiver according to embodiments of the present invention.

Referring to FIG. 2, a receiver according to embodiments of the present invention may include a channel state information receiver 202, a location adjustment unit 204, and a transmission capacity calculator 206.

The channel state information receiver 202 may receive pilot signals from antennas of the transmitter 100 of FIG. 1, and may verify information about a channel state based on the pilot signals.

The channel state information receiver 202 may verify channel states of the pilot signals received from the antennas of the transmitter 100 for each predetermined period. The channel state information receiver 202 may receive the pilot signals received from each antenna of the transmitter 100 using different time-slots or subcarriers so as to avoid collisions. The information about a channel state may include information about a signal to noise ratio (SNR) of a signal received by the receiver.

The location adjustment unit 204 may adjust locations of the antennas by referring to the information about a channel state based on the pilot signals received from the antennas of the transmitter 100. The location adjustment unit 204 may adjust, based on the information about a channel state, an angle and a direction of receiving a signal for antennas of the receiver 200 of FIG. 1, and an interval between antennas of the transmitter 100.

The transmitter 100 may include a location adjustment unit, and may adjust an angle and a direction of the transmitter 100 based on an adjustment of antennas of the receiver 200.

Antennas of the transmitter 100 and the receiver 200 may be adjusted either concurrently or individually.

The transmission capacity calculator 206 may calculate transmission capacity values according to the adjusted locations, and may compute a transmission capacity value having a highest value among the transmission capacity values calculated. In particular, transmission capacity calculator 206 may verify a channel state of pilot signals received from the transmitter 100, and may calculate transmission capacity values that are changed according to an adjusted antenna.

Figure 3:
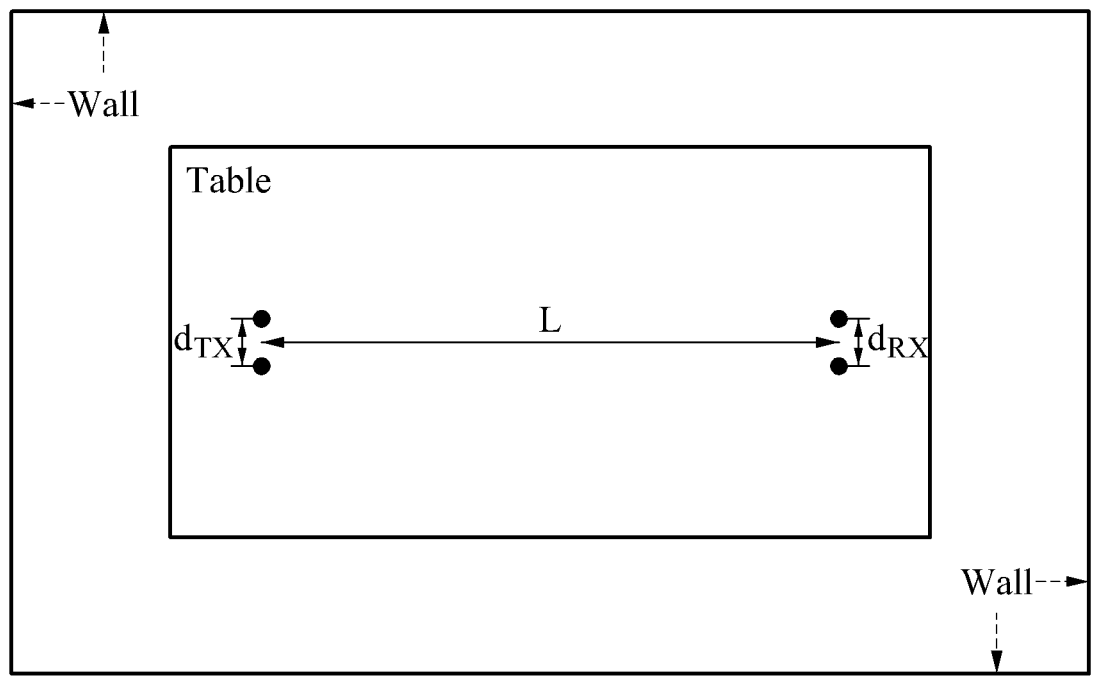
FIG. 3 is a diagram illustrating an example of including a transmitter having two antennas and a receiver having two antennas according to embodiments of the present invention.

FIG. 3 is a diagram illustrating an example of including a transmitter having two antennas and a receiver having two antennas according to embodiments of the present invention.

FIG. 3 illustrates a transmitter having two antennas and a receiver having two antennas placed on a table in an indoor conference room.

The transmitter 100 and the receiver 200 are spaced apart from each other by about a distance of L.

The two antennas of the transmitter 100 are spaced apart from each other by about a distance of $d_{TX}$, and the two antennas of the receiver 200 are spaced apart from each other by about a distance of $d_{RX}$.

Figure 4:
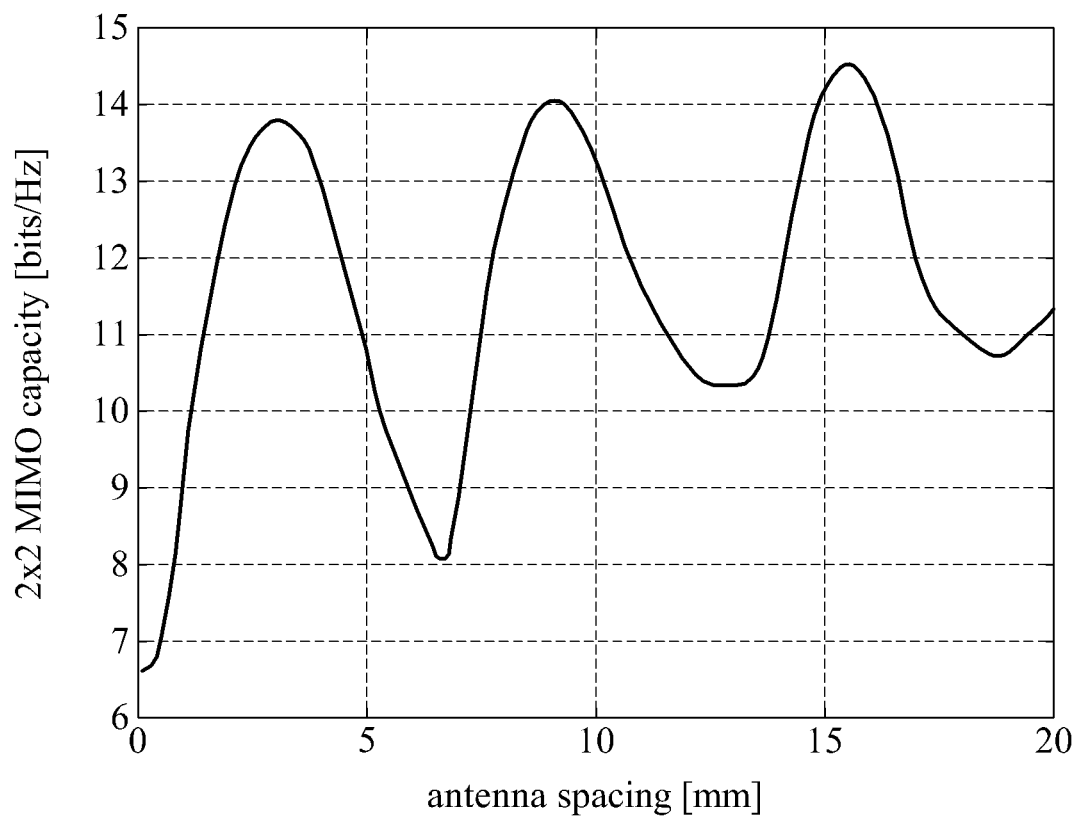
FIG. 4 is a graph illustrating a channel capacity with respect to an antenna interval of FIG. 3.

FIG. 4 is a graph illustrating a channel capacity with respect to an antenna interval of FIG. 3.

The transmitter 100 and the receiver 200 are spaced apart from each other by about a distance L, corresponding to about 3 m, and the transmitter 100 and the receiver 200 are disposed at a location corresponding to coordinates of about 4.5 m and 4 m of a horizontal axis and a vertical axis, respectively.

The graph of FIG. 4 depicts a channel capacity with respect to an antenna interval of the transmitter 100 and an antenna interval of the receiver 200 when the transmitter 100 and the receiver 200 are disposed at a center of a space, an SNR corresponds to about 20 decibels (dB), and a signal having a frequency of about 60 gigahertz (GHz) is used.

That is, the graph of FIG. 4 illustrates that a transmission capacity is relatively superior when an antenna interval corresponds to distances of about 3 millimeters (mm), 8.5 mm, and 15.5 mm.

Figure 5:
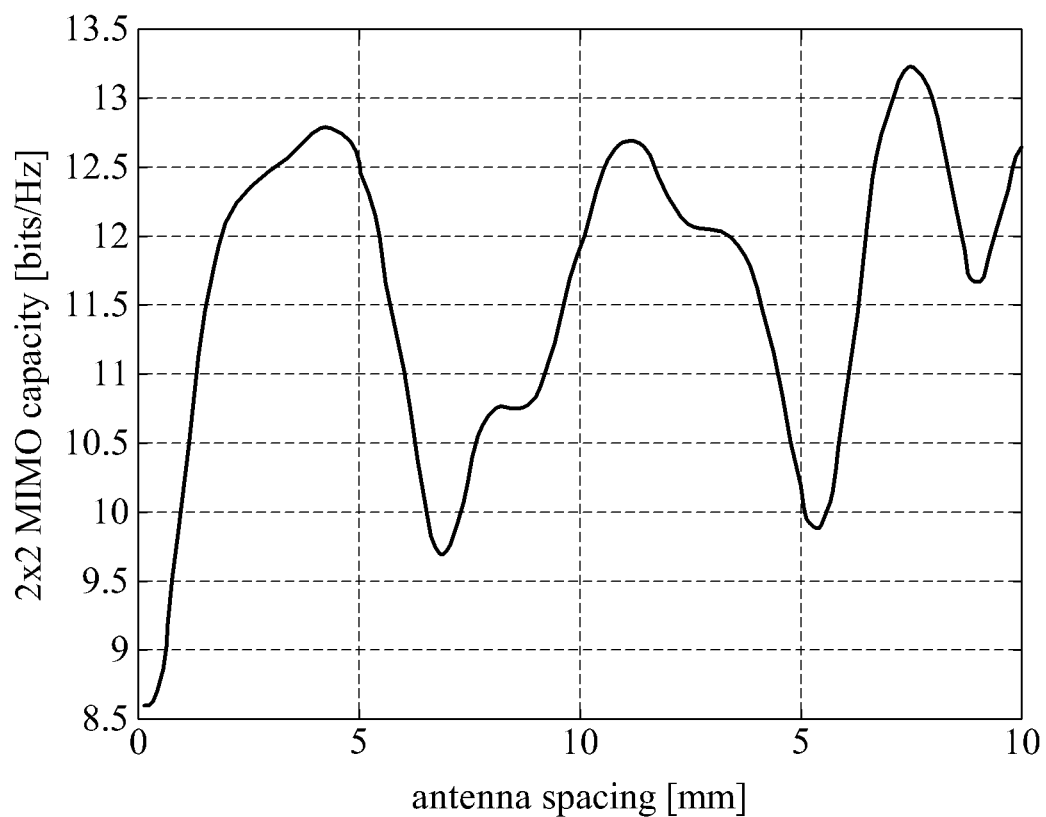
FIG. 5 is a graph illustrating a change of a channel capacity with respect to an antenna interval when locations of a receiver and a transmitter of FIG. 4 are changed.

FIG. 5 is a graph illustrating change of a channel capacity with respect to an antenna interval when locations of a receiver and a transmitter of FIG. 4 are changed.

The graph of FIG. 5 has a similar measuring environment to the graph of FIG. 4, and illustrates a changed transmission capacity when the transmitter 100 and the receiver 200 are disposed at a location about 0.3 m along a vertical axis.

Referring to the graphs of FIG. 4 and FIG. 5, an optimal antenna interval varies depending on locations of the transmitter 100 and the receiver 200.

Thus, a channel may be changed depending on locations of the transmitter 100 and the receiver 200, and the location adjustment unit 204 of FIG. 2 may adjust an antenna interval to be appropriate to a changed channel.

Figure 6:
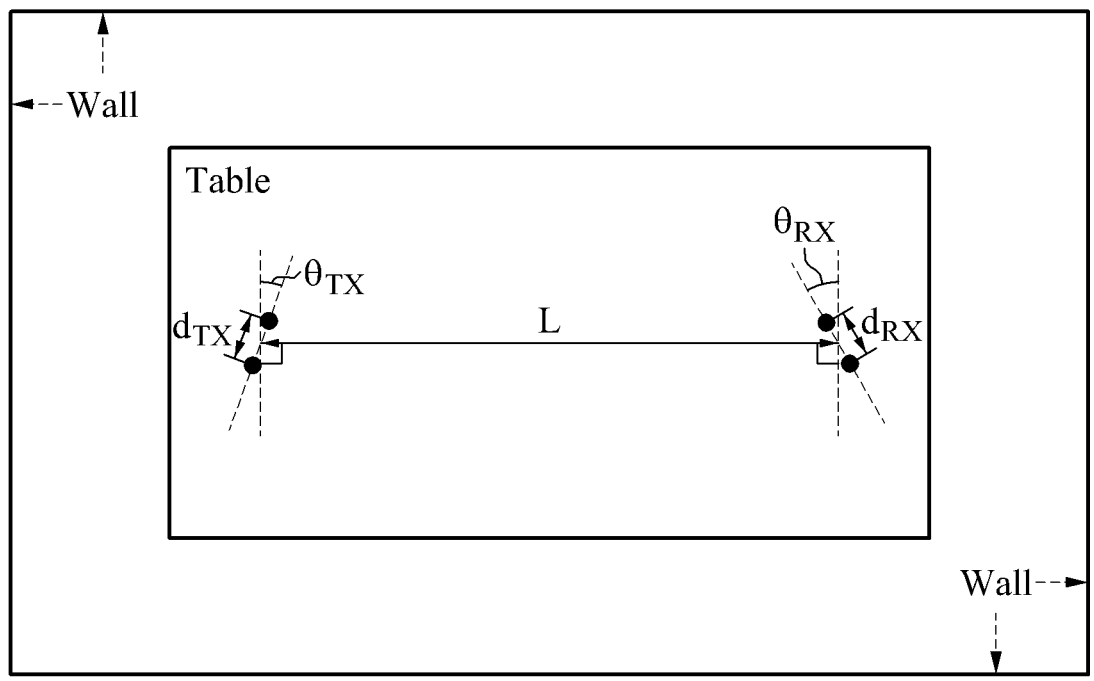
FIG. 6 is a diagram illustrating an example in which directions of multiple transmitting antennas and multiple receiving antennas are rotated according to embodiments of the present invention.

FIG. 6 is a diagram illustrating an example in which directions of multiple transmitting antennas and multiple receiving antennas are rotated according to embodiments of the present invention.

FIG. 6 illustrates the multiple transmitting antennas having a direction rotated by a value of about $\theta_{TX}$, and the multiple receiving antennas has a direction rotated by a value of about $\theta_{RX}$.

Figure 7:
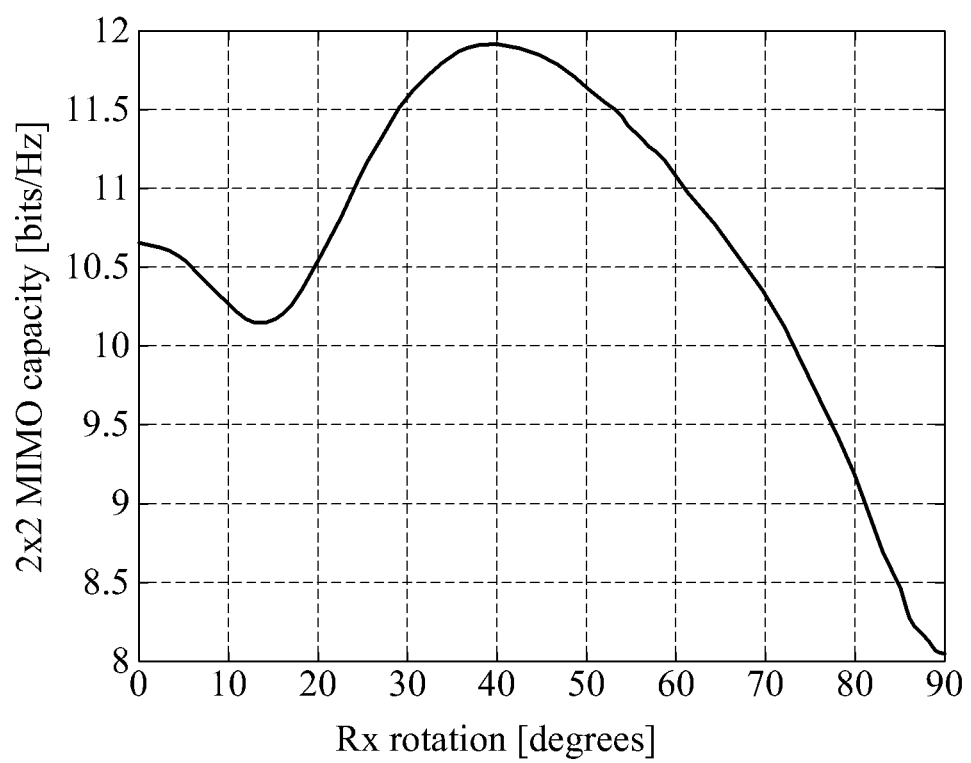
FIG. 7 is a graph illustrating a change of a channel capacity when directions of multiple receiving antennas are changed according to embodiments of the present invention.

FIG. 7 is a graph illustrating change of a channel capacity when directions of multiple receiving antennas are changed according to embodiments of the present invention.

In a measuring environment of a transmission capacity of FIG. 7, the transmitter 100 and the receiver 200 are disposed at a center of a space for measuring a transmission capacity.

The transmitter 100 and the receiver 200 are spaced apart from each other by a distance L, corresponding to about 3 m. Antennas of the transmitter 100 and antennas of the receiver 200 are spaced apart from each other by distances $d_{TX}$ and $d_{RX}$, about 5 mm apart, respectively.

When a direction of a transmitting antenna corresponds to $\theta_{TX}=0$ degrees in a different measuring environment, a transmission capacity may vary depending on a direction of a receiving antenna $\theta_{RX}$ as illustrated in FIG. 7 that depicts a transmission capacity with respect to a direction of the receiving antenna.

That is, a transmission capacity may vary depending on a direction as well as an interval between antennas of the transmitter 100 or the receiver 200.

The location adjustment unit 204 may set antennas so that data may be received with a relatively high transmission capacity by adjusting an interval of the transmitter 100 and the receiver 200 and by adjusting a direction of antennas.

Embodiments of the present invention have been described with an example of changing a setting of antennas at the receiver 200. However, a setting of antennas based on a channel state may be changed at the transmitter 100 as well as at the receiver 200.

The transmitter 100 may include a pilot signal transmitter to transmit pilot signals to the receiver 200. The receiver 200 may calculate a transmission capacity value based on a channel state according to pilot signals transmitted from the pilot signal transmitter to the receiver 200. The transmitter 100 may receive the calculated transmission capacity from the receiver 200 each time a location, an angle, an interval, and the like corresponding to a setting of antennas of the transmitter 100 are adjusted. The transmitter 100 may set antennas to be in a state of receiving a transmission capacity value having a relatively high value based on a result of receiving the transmission capacity value. Accordingly, it is possible to easily receive a signal of a relatively high quality by adjusting an antenna state in at least one of the transmitter 100 and the receiver 200.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A communication method using adaptive multiple antennas, the communication method comprising:
   verifying information about a channel state based on a pilot signal transmitted for each of a plurality of antennas of a transmitter;
   adjusting intervals among a plurality of antennas of a receiver based on the information about the channel state, each interval being a distance between locations of corresponding two of the plurality of antennas;
   calculating transmission capacity values according to the adjusted intervals; and
   setting intervals among the plurality of antennas of the transmitter corresponding to a transmission capacity having a highest value among the calculated transmission capacity values.

2. The communication method of claim 1, further comprising receiving the information about the channel state and verifying the information for each predetermined period.

3. The communication method of claim 1, wherein the pilot signals received from the plurality of antennas of the transmitter are received using different time-slots or subcarriers so as to avoid collisions.

4. The communication method of claim 1, wherein the adjusting comprises calculating a transmission capacity of a received pilot signal while increasing each antenna interval by a predetermined interval.

5. The communication method of claim 1, wherein the information about a channel state includes information about a signal to noise ratio (SNR) of a signal received by the receiver.

6. A communication device using adaptive multiple antennas, the communication device comprising:
   a channel state information receiver configured to receive pilot signals from a plurality of antennas of a transmitter, and to verify information about a channel state based on the pilot signals;
   a location adjustment unit configured to adjust intervals among the plurality of antennas by referring to the information about a channel state based on the pilot signals received from the antennas of the transmitter, each interval being a distance between locations of corresponding two of the plurality of antennas; and
   a transmission capacity calculator configured to calculate transmission capacity values according to the adjusted locations, and to compute a transmission capacity value having a highest value among the calculated transmission capacity values.

7. The communication device of claim 6, wherein the channel state information receiver verifies the channel state of the pilot signals received from the antennas of the transmitter for each predetermined period.

8. The communication device of claim 6, wherein the channel state information receiver receives the pilot signals received from each antenna of the transmitter using different time-slots or subcarriers so as to avoid collisions.

9. The communication device of claim 6, wherein the location adjustment unit calculates transmission capacity values of received pilot signals while increasing each antenna interval by a predetermined interval.

10. The communication device of claim 6, wherein the location adjustment unit adjusts an interval, a location, and a direction of antennas so that the transmission capacity values calculated reaches a maximum value.

11. A communication method using adaptive multiple antennas, the communication method comprising:

transmitting, by a transmitter, pilot signals corresponding to a plurality of antennas of a receiver;

receiving, by the transmitter, transmission capacity values from the receiver; and setting antenna intervals between a plurality of antennas of the transmitter corresponding to a transmission capacity having a highest value among the received transmission capacity values, each antenna interval being a distance between locations of corresponding two of the plurality of antennas.

12. The communication method of claim 11, wherein the transmission capacity values are calculated based on information about a channel state received in the receiver, and are received as response signals when one of the pilot signals is transmitted in a state in which an antenna setting is changed in one of the antennas of the transmitter.

13. A communication device using adaptive multiple antennas, the communication device comprising:

a pilot signal transmitter configured to transmit pilot signals corresponding to a plurality of antennas of a receiver; and a location adjustment unit configured to adjust intervals among a plurality of antennas of a transmitter by receiving, from the receiver, information about a channel state based on the transmission of the pilot signals, each interval being a distance between locations of corresponding two of the plurality of antennas.

14. The communication device of claim 13, wherein the location adjustment unit sets each of the antennas to a location at which a transmission capacity value corresponds to a highest value by verifying the transmission capacity value based on the information about a channel state received from the receiver in response to a change of antenna settings.

* * * * *